United States Patent
Graham et al.

(10) Patent No.: US 10,621,609 B2
(45) Date of Patent: Apr. 14, 2020

(54) GROUP-BASED PURCHASING INCENTIVES

(71) Applicant: International Business Machines Corporation, Armonk, NY (US)

(72) Inventors: Ryan M. Graham, Durham, NC (US); Jeremy A. Greenberger, Raleigh, NC (US); Ciaran E. Hannigan, Morrisville, NC (US); Matthew J. Margolis, Raleigh, NC (US); Kevin M. J. Roisin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/396,945

(22) Filed: Jan. 3, 2017

(65) Prior Publication Data
US 2018/0189815 A1    Jul. 5, 2018

(51) Int. Cl.
*G06Q 30/00* (2012.01)
*G06Q 30/02* (2012.01)

(52) U.S. Cl.
CPC ..... *G06Q 30/0214* (2013.01); *G06Q 30/0261* (2013.01)

(58) Field of Classification Search
CPC .......... G06Q 30/0214; G06Q 30/0261; G06Q 30/0267
USPC .............................. 705/14.16, 14.58, 14.64
See application file for complete search history.

(56) References Cited

U.S. PATENT DOCUMENTS

| | | | | |
|---|---|---|---|---|
| 6,985,879 B2* | 1/2006 | Walker | ................... | G06Q 20/10 705/14.13 |
| 9,626,689 B1* | 4/2017 | Bethke | ................... | A63F 13/85 |
| 2003/0096621 A1* | 5/2003 | Jana | .................. | G08G 1/0104 455/456.1 |
| 2008/0054072 A1* | 3/2008 | Katragadda | ............ | G08G 1/123 235/384 |
| 2010/0179856 A1* | 7/2010 | Paretti | .................... | G06Q 30/02 705/14.1 |
| 2010/0179868 A1* | 7/2010 | del Rosario | ....... | G06Q 30/0214 705/14.16 |
| 2013/0225199 A1 | 8/2013 | Shaw | | |
| 2013/0290097 A1* | 10/2013 | Balestrieri | ......... | G06Q 30/0224 705/14.49 |

(Continued)

OTHER PUBLICATIONS

Attila Ambrus et al., "Group versus individual decision-making: Is there a shift?*", May 2009, 37 pages.

(Continued)

*Primary Examiner* — Luis A Brown
(74) *Attorney, Agent, or Firm* — Isaac J. Gooshaw; Hunter E. Webb; Keohane & D'Alessandro PLLC (57) ABSTRACT

Approaches presented herein enable providing a group-based purchasing incentive related to a product or service at a retail store to a customer among a group of customers contingent on an action being performed by a predefined number of members from the group. Specifically, a customer in a retail store is identified as part of a group of customers. A notification of a group-based purchasing incentive offer is transmitted to a mobile device of the identified customer. The offer is contingent on a specified number of other customers in the group performing an action. When the specified number of other customers in the group have performed the action, the group-based purchasing incentive is provided to the identified customer.

20 Claims, 6 Drawing Sheets

(56) References Cited

U.S. PATENT DOCUMENTS

| | | | | |
|---|---|---|---|---|
| 2014/0032669 A1* | 1/2014 | Hughes | ............... | H04W 4/21 |
| | | | | 709/204 |
| 2014/0081753 A1* | 3/2014 | Mesaros | ............ | G06Q 30/0222 |
| | | | | 705/14.54 |
| 2015/0009116 A1* | 1/2015 | Mangold | ............... | G06F 3/017 |
| | | | | 345/156 |
| 2015/0065146 A1* | 3/2015 | Wenger | ............... | H04W 36/32 |
| | | | | 455/440 |
| 2015/0081408 A1 | 3/2015 | Barker | | |
| 2015/0149254 A1* | 5/2015 | Sakamoto | ......... | G06Q 30/0201 |
| | | | | 705/7.34 |
| 2015/0181481 A1* | 6/2015 | Masini | ............. | H04W 36/0083 |
| | | | | 455/436 |
| 2015/0227983 A1* | 8/2015 | Eustace | ............... | H04W 4/21 |
| | | | | 705/7.33 |
| 2015/0326624 A1* | 11/2015 | Rajendran | ............ | H04L 67/12 |
| | | | | 709/204 |
| 2016/0104221 A1 | 4/2016 | Zakusilo | | |
| 2016/0148507 A1* | 5/2016 | Pittman | ............... | H04W 4/029 |
| | | | | 340/917 |

OTHER PUBLICATIONS

"Proximity Marketing Together with Micro-Location Marketing Can Give a Better Result for Retail", https://retailstoreanalytics.wordpress.com/2015/06/16/proximity-marketing-and-micro-location-marketing/, Jun. 16, 2015, 6 pages.

* cited by examiner

GROUP-BASED PURCHASING INCENTIVES

TECHNICAL FIELD

This invention relates generally to customer incentive programs and, more specifically, to providing a group-based purchasing incentive related to a product or service at a retail store to a customer among a group of customers contingent on an action being performed by a predefined number of members from the group.

BACKGROUND

Various approaches have been used to deliver purchasing incentives, usually in the form of printed discount coupons, to customers of retail stores. Customarily, coupons are issued by manufacturers of customer packaged goods or by retailers, to be used in retail stores as a part of sales promotions. Coupons have been distributed to customers by mail, either in a random manner or in a more demographically focused manner. Coupons have also been delivered to customers in retail stores, either from kiosks or at the check-out counter in response to the customer's purchase of some preselected item or items. More recently, printable coupons from the Internet and mobile coupons have gained in popularity. A mobile coupon is an electronic ticket solicited and/or delivered to a mobile device that can be exchanged for a financial discount or rebate when purchasing a product or service.

SUMMARY

In general, embodiments of the present invention enable providing a group-based purchasing incentive related to a product or service at a retail store to a customer among a group of customers contingent on an action being performed by a predefined number of members from the group. Specifically, a customer in a retail store is identified as part of a group of customers. A notification of a group-based purchasing incentive offer is transmitted to a mobile device of the identified customer. The offer is contingent on a specified number of other customers in the group performing an action. When the specified number of other customers in the group have performed the action, the group-based purchasing incentive is provided to the identified customer.

One aspect of the present invention includes a computer-implemented method for providing a group-based purchasing incentive, the method comprising: identifying a customer in a retail store that is part of a group of customers; transmitting a notification of a first group-based purchasing incentive offer to a mobile device of the identified customer, wherein the first group-based purchasing incentive offer is contingent on a first specified number of other customers in the group performing an action; and providing, in response to the first specified number of other customers in the group performing the action, the first group-based purchasing incentive to the identified customer.

Another aspect of the present invention includes a computer program product for providing a group-based purchasing incentive, and program instructions stored on the computer readable storage device, to: identify a customer in a retail store that is part of a group of customers; transmit a notification of a first group-based purchasing incentive offer to a mobile device of the identified customer, wherein the first group-based purchasing incentive offer is contingent on a first specified number of other customers in the group performing an action; and provide, in response to the first specified number of other customers in the group performing the action, the first group-based purchasing incentive to the identified customer.

Yet another aspect of the present invention includes a computer system for providing a group-based purchasing incentive, the computer system comprising: a memory medium comprising program instructions; a bus coupled to the memory medium; and a processor for executing the program instructions, the instructions causing the system to: identify a customer in a retail store that is part of a group of customers; transmit a notification of a first group-based purchasing incentive offer to a mobile device of the identified customer, wherein the first group-based purchasing incentive offer is contingent on a first specified number of other customers in the group performing an action; and provide, in response to the first specified number of other customers in the group performing the action, the first group-based purchasing incentive to the identified customer.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention enable providing a group-based purchasing incentive related to a product or service at a retail store to a customer among a group of customers contingent on an action being performed by a predefined number of members from the group. Specifically, a customer in a retail store is identified as part of a group of customers. A notification of a group-based purchasing incentive offer is transmitted to a mobile device of the identified customer. The offer is contingent on a specified number of other customers in the group performing an action. When the specified number of other customers in the group have performed the action, the group-based purchasing incentive is provided to the identified customer.

Atlanta businessman Asa Candler had a brainstorm in 1887 when he created the first coupon. Candler's coupons transformed Coca-Cola from an insignificant tonic into a market-dominating drink. His handwritten tickets offered consumers a free glass of Coca-Cola, then priced at five cents. Between 1894 and 1913, an estimated one-in-nine Americans had received a free Coca-Cola, for a total of 8,500,000 free drinks. By 1895, Coca-Cola was being served in every state.

Admittedly, coupons and other purchasing incentives have since become commonplace among shoppers. With the advances in modern technology, mobile coupons are becoming increasingly used by marketers. A mobile coupon is an electronic ticket solicited and or delivered to a mobile phone that can be exchanged for financial discount or rebate when purchasing a product or service. Coupons are usually issued by manufacturers of consumer packaged goods or retailers, to be used in retail stores as part of a sales promotion. They are often distributed through wireless application protocol (WAP) push, over short message service (SMS) or multimedia messaging service (MMS), through geo-fencing technology, or other mobile means. In some cases, customers may redeem the mobile coupon at the point of sale.

The inventors of the invention described herein have recognized certain deficiencies in known methods for providing purchasing incentives to a customer. It may be advantageous to a retail store to also influence the behavior of others located within the retail store. This approach leverages the relationships of a known customer to influence the behavior of those shopping with the known customer in the retail store. For example, a purchasing incentive offer may be provided to a known customer if he/she is able to persuade one or more members of his/her shopping group to perform an action, such as download the retail store's mobile application, purchase a particular product or service, or move to a particular area of the retail store. The approaches described herein provide a seamless way for providing a group-based purchasing incentive related to a product or service at a retail store to a customer among a group of customers contingent on an action being performed by a predefined number of members from the group.

In certain embodiments, an advantage of this approach is its optimization of computing overhead. Computing overhead is generally considered any combination of excess or indirect computation time, memory, bandwidth, or other resources that are required to attain a particular goal. The consumption of computing resources is optimized by providing group-based purchasing incentives, in that by providing a group-based purchasing incentive to a known customer, the behavior of both the known customer and one or more members of the customer's shopping group may be influenced to the advantage of the retail store.

This approach may further increase the number of customer relationships that can be attained by the retail store in cases where the group member action includes downloading a mobile application related to the retail store. Alternatively or in addition, this approach may increase the likelihood of a product or service sale based on the purchasing incentive provided to the customer, as well as requiring one or more group members purchase a particular product or service or by having one or more group members navigate to a particular area of the store (e.g., such as a clearance aisle, etc.).

Figure 1:
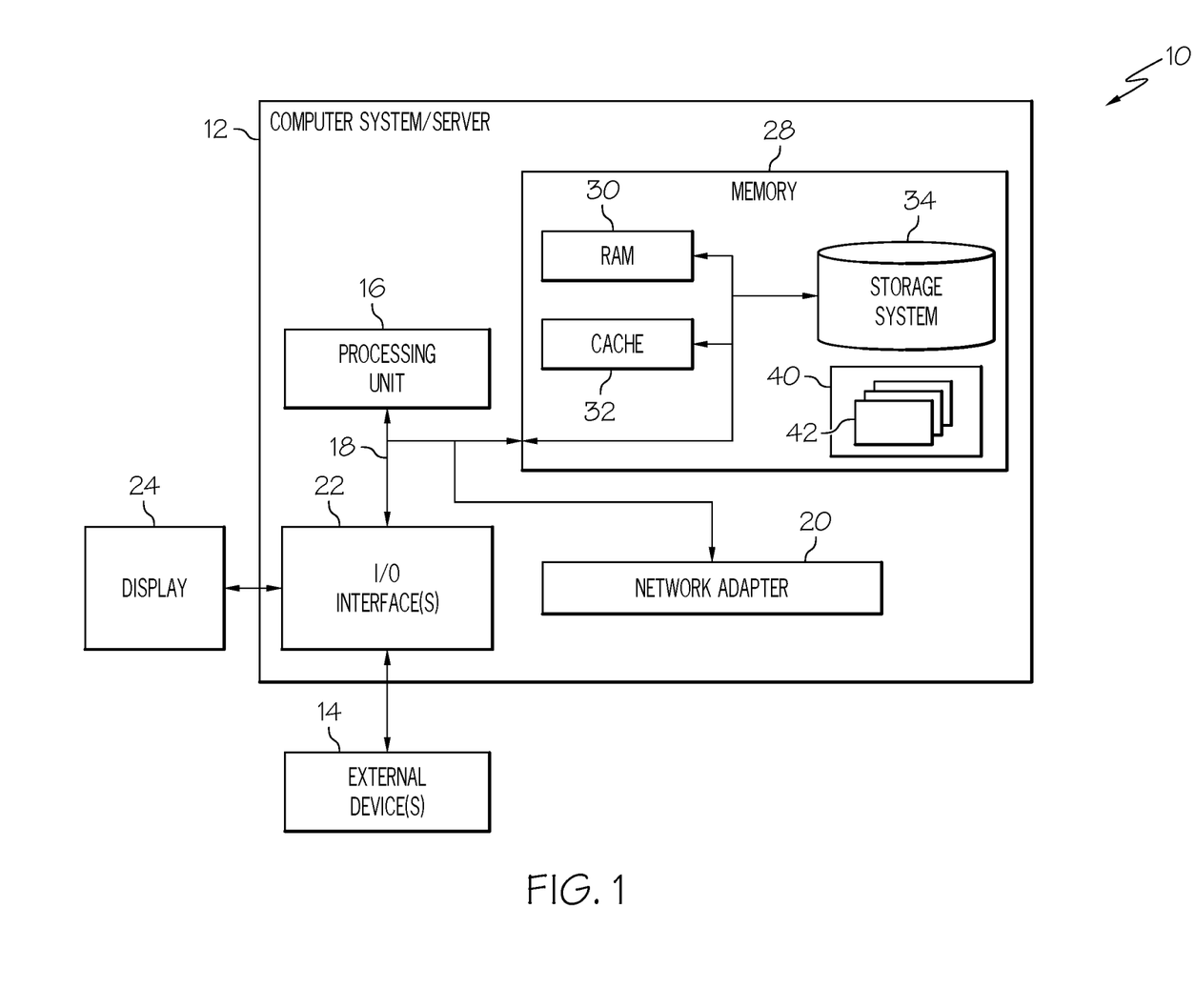
FIG. 1 shows an architecture 10 in which the invention may be implemented according to illustrative embodiments.

Referring now to FIG. 1, a computerized implementation 10 of an embodiment for providing a group-based purchasing incentive related to a product or service at a retail store to a customer among a group of customers contingent on an action being performed by a predefined number of members from the group will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable customer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for providing a group-based purchasing incentive related to a product or service at a retail store to a customer among a group of customers contingent on an action being performed by a predefined number of members from the group. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for providing a group-based purchasing incentive related to a product or service at a retail store to a customer among a group of customers contingent on an action being performed by a predefined number of members from the group, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a customer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Movements of a customer having an enabled mobile device can be tracked as the customer moves inside a retail store using techniques known in the art, such as IBM® Presence Insights. IBM® Presence Insights works by sensing the presence of the mobile device through a collection of location sensing techniques. For example, wireless fidelity (Wi-Fi) enabled mobile devices that connect to a guest Wi-Fi system in a retail store, or a retail store's mobile app sensing a known Bluetooth beacon. Location sensing via wireless triangulation or satellite may be used as well. After the mobile device is detected, a device identifier (e.g., a Globally Unique Identifier or "GUID") is assigned for the device. In one example, the device identifier is the MAC address for the device. In another example, a customer may download a software development kit (SDK) to his mobile device. A GUID is then assigned to the mobile device and used as the device identifier. The mobile device is tracked as it moves through the retail store.

Location sensing technologies enable a retail store to extend customer service and support through mobile devices. For example, a retail store can use location sensing to transform the in-store customer experience by using intelligent location-based technology to engage shoppers in near real time to influence and increase sales in the store. Existing location sensing technologies may further collect location data related to position information of mobile devices over time as customers move through a retail store. The location data can then be used to determine which customers are part of a group.

Movements of customers can be captured and tracked as they move inside a retail store using tracking techniques known in the art, such as RetailNext from RetailNext, Inc. of San Jose, Calif. The RetailNext system includes a tracking server which is responsible for tracking customers as they move throughout the retail store. The tracking server can track a particular customer as the customer moves across the different camera views of each camera. A track is a path that a particular customer followed during the customer's visit to the store. The location data and/or the tracks of the customers may be used to determine which customers (and their respective mobile devices) are part of a group. For example, a first customer and second customer may be determined to be shopping together when they enter a retail store at substantially the same time (e.g., within a few seconds) and move about the store together (e.g., within several feet of each other for a predefined amount of time), as determined by the location data and/or tracks of two customers.

The system described in this disclosure provides a comprehensive in-store incentives platform for delivering group-based purchasing incentives to influence the purchasing habits of its customers. Specifically, the retail store may provide purchasing incentives to increase sales through a mobile application (or "app") installed on a mobile device of a customer which connects with the customer's retail store account. The purchasing incentives may include coupons, such as mail-in rebates, redemptions, and savings at the point of sale. It is widely known within the retail industry that customers purchase products based, in part, on convenience. This is equally true of coupon redemption. It is also true that most coupons are presented in a superfluous manner or at an inopportune time to customers without inherent value or usefulness. Hence, only about one percent of all coupons issued are redeemed. If using a coupon is unduly burdensome, the customer will be less likely to redeem the coupon. If the principal reason the customer was going to purchase the product was because of the incentive offered on the coupon, the store is in danger of losing the sale.

Further, the system described herein allows a retail store to increase the activity of its customers on its mobile application. An effective mobile application can be more than just a convenient way to purchase a product. It can also provide a personalized experience that relates both to a customer's interests and conveys details about items on a physical retail shelf. A mobile application can be push-based, meaning it can anticipate a customer's needs and provide pertinent information based on those needs. For example, if a mobile application "knows" (e.g., based on prior purchases) a user interested in a certain brand or product, it can automatically send updates about pricing information or availability without the customer having to ask about it. By providing a mobile experience, a retail store is able to meet customers where they spend much of their time, which helps maintain a pleasant relationship between the customers and the store and may keep the customers coming back.

Figure 2:
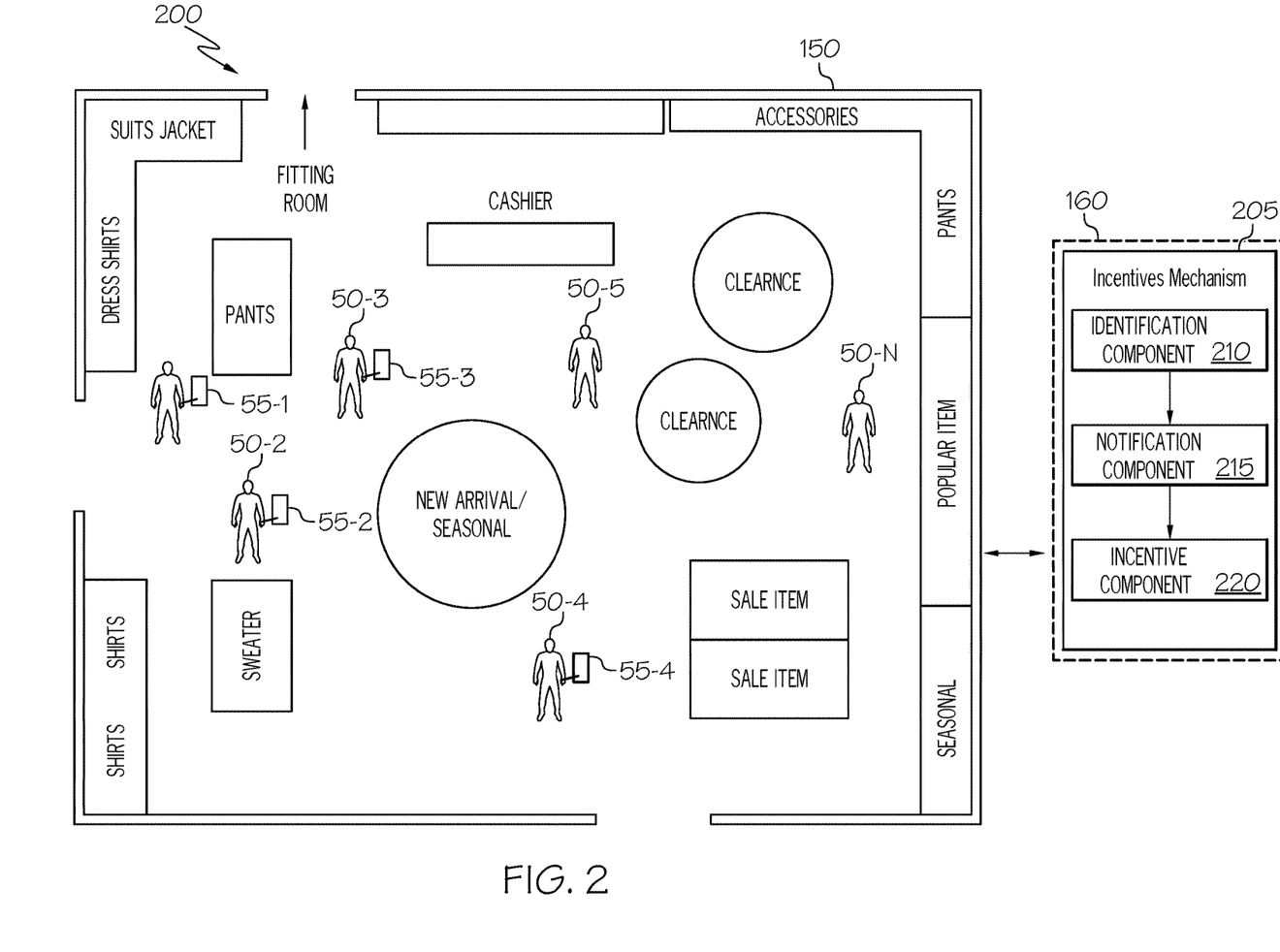
FIG. 2 shows a block diagram 200 illustrating an incentives mechanism 205 according to illustrative embodiments.

FIG. 2 shows a schematic diagram 200 illustrating an exemplary environment for implementation according to illustrative embodiments. As shown, environment 200 includes retail store 150 and incentives server 160. Retail store 150 includes a number of customers 50-1 through 50-N, and a number of mobile devices 55-1 through 55-N associated with the customers 50-1 through 50-N. Retail space 150 may also include a number of locating devices (e.g., store cameras) (not shown) configured to capture and track customers 50 as they move inside retail store 150. Mobile devices 55 and the store cameras may be coupled to incentives server 12 via network 58. The network 58 may be any type of network or any combination of networks. Specifically, the network 58 may include wired components, wireless components, or both wired and wireless components. In one exemplary embodiment, the network 58 is a distributed public network such as the Internet, where the participating devices 81 and user device 84 are enabled to connect to the network 58 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

Mobile devices 55 may be mobile smart phones, portable media player devices, portable fitness devices, mobile gaming devices, or the like. Some exemplary devices that may be programmed or otherwise configured to operate as group member devices 81 and/or user device 84 are the Apple® iPhone®, the Motorola Droid or similar phone running Google's Android™ Operating System, an Apple® iPad™, and the Apple® iPod Touch® device (iPhone, iPad, iPod Touch are registered trademarks owned by Apple Inc. Android is a registered trademark owned by Google Inc.). However, this list of exemplary devices is not exhaustive and is not intended to limit the scope of the present disclosure.

Referring back to FIG. 2, incentives mechanism 205 describing the functionality discussed herein according to an embodiment of the present invention is shown. It is understood that the teachings recited herein may be practiced within any type of computing environment (e.g., computer system/server 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have an incentives mechanism 205 (hereinafter "system 205"). Rather, system 205 could be loaded on a server (e.g., incentives server 160) or server-capable device that communicates (e.g., wirelessly) with the physical server to provide the functions described herein.

Regardless, as depicted, system 205 can be implemented as program/utility 40 on computer system/server 12 of FIG. 1 and can enable the functions recited herein. It is further understood that system 205 may be incorporated within or work in conjunction with any type of system that receives, processes, and/or executes commands with respect to IT resources in a networked computing environment. Such other system(s) have not been shown in FIG. 2 for brevity purposes. As shown, incentives mechanism 205 includes identification component 210, notification component 215, and incentive component 220 which will be described in detail below.

Consider the following example described below with reference to FIGS. 2-5. A customer may "opt in" to a service to receive purchasing incentives from a retail store as they shop the retail store on a substantially real-time basis. In one embodiment, the customer may opt-in to the service by downloading and installing a mobile application related to the retail store. For example, ACME Store 150 may provide a mobile application (i.e., ACME Store application) for customers to download and utilize which provides, among other things, group-based purchasing incentives related to its products and/or services to its customers. In other examples, a customer may opt-in to the purchasing incentives service by other means, such as creating a retail store profile or account, completing an online questionnaire, providing a phone number and/or email address to a salesperson at the retail store, etc.

Figure 3:
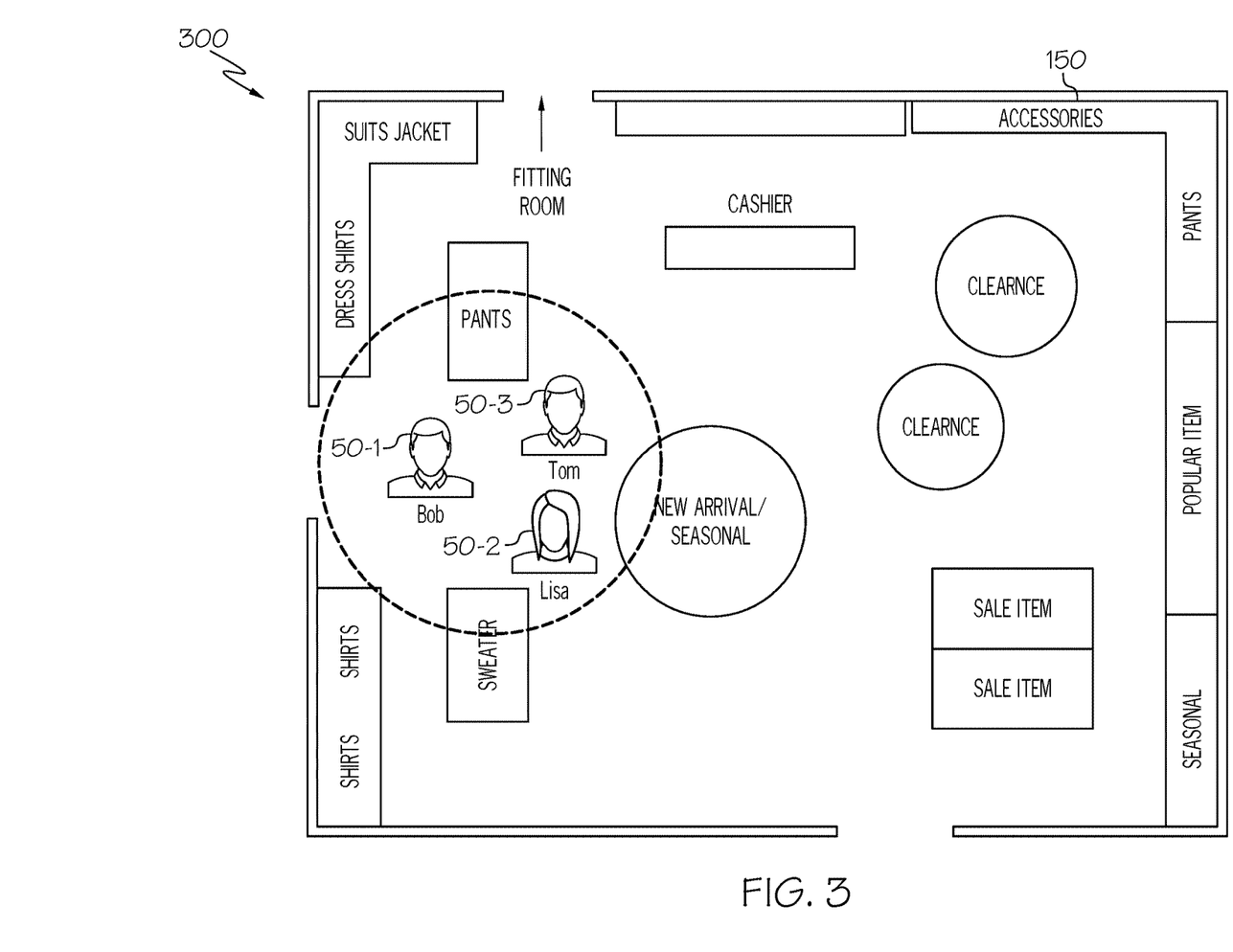
FIG. 3 shows retail store example 300 in which incentives mechanism 205 may operate according to illustrative embodiments.

As shown in FIG. 3, Bob (i.e., customer 50-1) shops at ACME Store 150 with his friends, Lisa (i.e., customer 50-2) and Tom (i.e., customer 50-3). Bob has the ACME Store application installed on his mobile device (i.e., mobile device 55-1) and is able to receive purchasing incentive offers while shopping at the ACME Store. Lisa is carrying mobile device 55-2, and Tom has mobile device 55-3. In this example, Lisa 50-2 and Tom 50-3 don't have the mobile application installed on their devices.

Identification component 210 of system 72, as executed by computer system/server 12, is configured to identify a customer physically located in a retail store is part of a group of customers using techniques known in the art. Identifying a customer as part of group may be based on a behavior of the group members in the retail store or detected relationships among the customers within the group. Identification component 210 is further configured to determine which customer mobile devices in the retail store have the retail store mobile application (e.g., ACME Store application) currently installed.

In an embodiment, identification component 210 may receive location data from mobile devices 55 using location sensing technologies known in the art. In addition, ACME Store 150 may include a set of cameras (not shown) for capturing and tracking customers as they move throughout ACME Store 150. The location data and/or the tracks of the customers may be used to determine which customers (and any respective mobile devices) are part of a group. For example, identification component 210 may identify Bob 50-1 as part of a group of customers because he entered the retail store with Lisa 50-2 and Tom 50-3 and they are tracked moving about the store as a group as they shop. Further, identification component 210 determines Bob 50-1 has the ACME store mobile application installed on mobile device 55-1.

In another embodiment, identification component 210 of system 72, as executed by computer system/server 12, is configured to identify a customer as part of a group using known ambient proximity technology, such as SocialRadar. Using ambient proximity technology in real time, publicly available information about the individuals in proximity to the identified customer can be gathered by connecting to each individual's Twitter®, Facebook®, LinkedIn®, Foursquare®, Instagram® and Google+® accounts to pull in data about their whereabouts, recent activities, and connections. In addition, ambient proximity technology can determine which of their contacts or connections are close by, how they know each other, and what those connections have been doing. The gathered data can be analyzed to identify one or more of the individuals near the identified customer. If the identified customer is determined to have a relationship with the other nearby individuals, it can be assumed the customer is part of the group.

Notification component 215 of system 72, as executed by computer system/server 12, is configured to transmit to a customer who has opted in to receiving such offers, a purchasing incentive offer contingent on one or more group member actions being performed when identification component 210 determines the customer is part of a group. A group member action to be performed to receive the purchasing incentive may include, but is not limited to, having one or more group members make a particular purchase, download a mobile application related to the retail store, visit a specific area of the retail store, and/or sign up for service provided by the retail store (e.g., email coupons, newsletter, loyalty program, etc.). If the group member action is performed, the purchasing inventive is provided to the customer.

Figure 4:
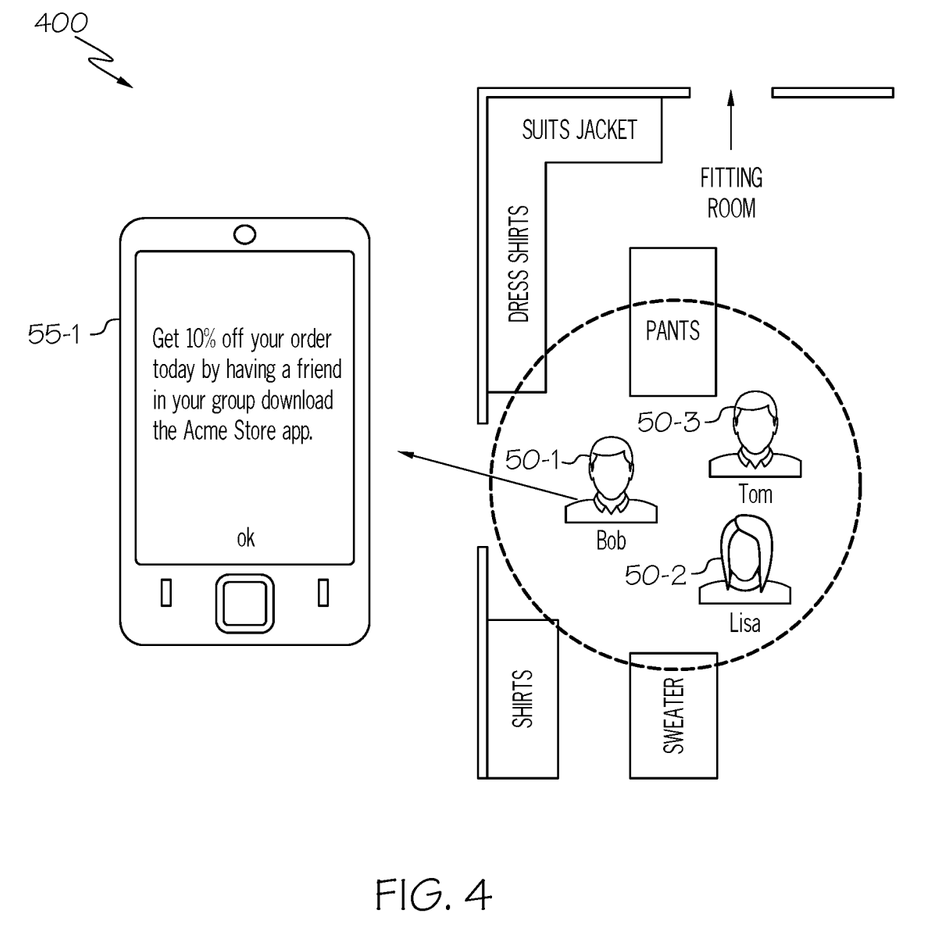
FIG. 4 shows retail store example 400 in which incentives mechanism 205 may operate according to illustrative embodiments.

For example, notification component 215 provides a purchasing incentive offer to Bob 50-1 on mobile device 55-1 as Bob 50-1 continues to shop with others. As shown in FIG. 4, a purchasing incentive offer is displayed on mobile device 55-1. The offer states that Bob 50-1 will get 10% off any items bought today if he can get one of the other members in his group (i.e., Lisa 50-2 or Tom 50-3) to install the ACME store application on his/her respective mobile device (i.e., mobile device 55-2 or mobile device 55-3). Bob 50-1 speaks to the others, and Lisa 50-2 agrees to install the mobile application on mobile device 55-2.

Figure 5:
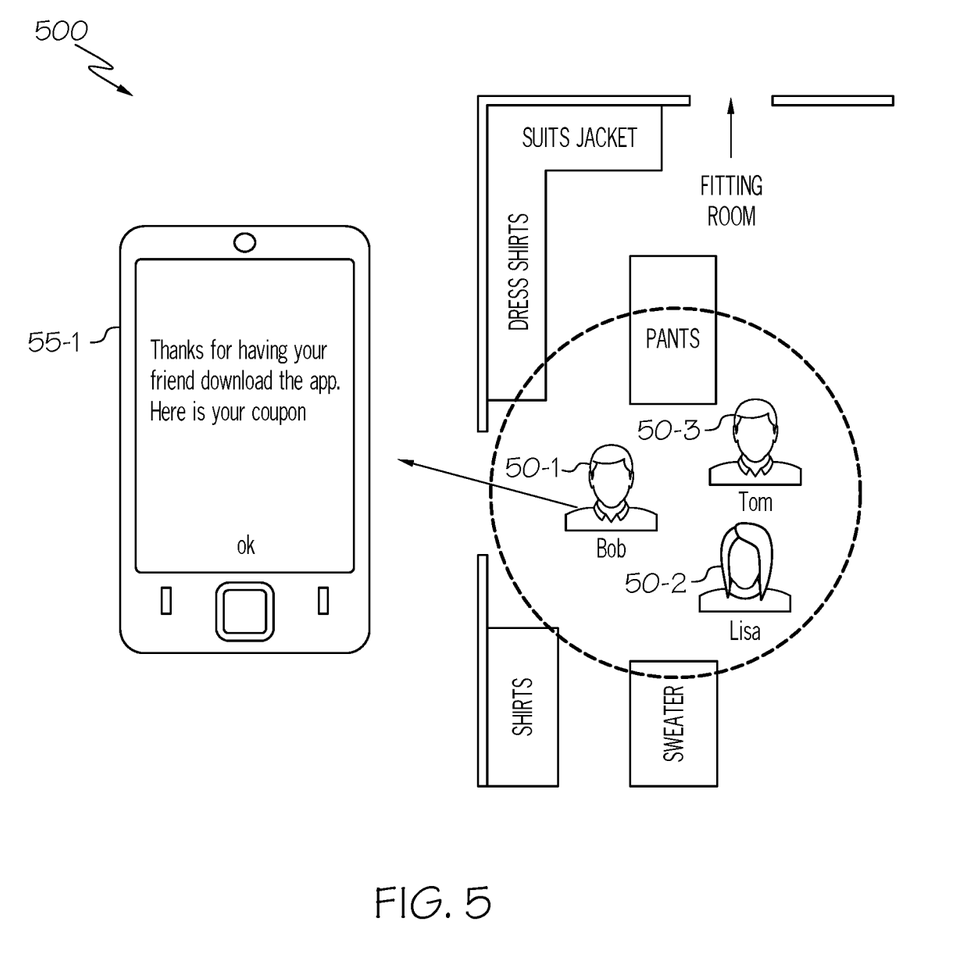
FIG. 5 shows retail store example 500 in which incentives mechanism 205 may operate according to illustrative embodiments.

Incentive component 220 of system 72, as executed by computer system/server 12, is configured to provide a purchasing incentive to a customer who has opted in to the service when the specified group member actions have been performed. A purchasing incentive (e.g., coupon, promotion code, discount, etc.) is displayed on the customer's mobile device. As shown in FIG. 5, a discount is displayed on mobile device 55-1. A 10% discount on all purchases made will be given to Bob 50-1 by a salesperson when Bob 50-1 finalizes his purchases at the retail store. In one example, the salesperson may manually apply the discount. In another example, a code (e.g., a digital coupon) may be displayed on the customer's mobile device screen which can be scanned by the salesperson to apply the discount. The code may be accessed by the customer via the retail store mobile application short message service (SMS) or text message, email message, etc.

Before providing the purchasing incentive to the customer, incentive component 220 may receive a confirmation that the specified group member actions have been performed. As stated earlier, example group member actions may include having a group member make a particular purchase, download a mobile application related to the retail store, visit a specific area of the retail store, and/or sign up for service provided by the retail store (e.g., email coupons, newsletter, loyalty program, etc.). Means of validation may be dependent upon the group member action(s) to be performed.

In an embodiment, incentive component 220 may provide a uniform resource locator (URL) to a customer's mobile device which can be sent/forwarded to each group member's mobile device seeking to complete the group member action. For example, a URL to download an ACME store application may be provided to Bob's mobile device 55-1 which can be sent to Lisa's mobile device 55-2 when Lisa 50-2 has agreed to download the mobile application. Alternatively or in addition, Bob 50-1 may provide a phone number for mobile device 55-2, and the URL can be sent directly to mobile device 55-2 allowing download of the mobile application. Incentive component 220 may receive a confirmation when Lisa 50-2 has completed the download. Similarly, a URL may be provided to the customer's mobile device and/or each group member's mobile device when the group member action involves signing up for a service provided by the retail store (e.g., email coupons, newsletter, loyalty program, etc.). The provided URL may allow each group member to complete the necessary service action. Incentive component 220 may receive a confirmation when each action related to the service has been performed.

In an embodiment, incentive component 220 may provide a code (e.g., bar code, quick response (QR) code, etc.) to the customer's mobile device which can be used to confirm when the action has been performed. For example, the code may be provided for display on the customer's mobile device screen or mobile device of each group member who has agreed to perform the action. The code may be provided via the retail store mobile application, text message, etc.

In some embodiments, the code, such as a QR code, can be scanned by a salesperson in the retail store at a point of sale (PoS) terminal of the retail store to provide confirmation that a group member action has been performed. For example, a QR code may be provided for display on mobile device 50-1 when the action to be performed is having a group member (e.g., Tom 50-3) purchase a particular product. If Tom 50-3 agrees, a QR code may be provided for display on mobile device 55-1 and/or mobile device 55-3. After making the purchase, a salesperson may scan (or snap) the QR code indicating the group member action has been performed. Incentive component 220 receives a confirmation when the code is scanned.

In an embodiment, incentive component 220 may receive a confirmation when a group member has moved to particular area of a retail store specified in a purchasing incentive offer when such movement is required for fulfilling the offer. For example, tracking data and/or location data from one or more retail store cameras and/or mobile devices may be used to determine whether a group member has visited the specified area of the retail store. Incentive component 220 receives a confirmation when the group member has moved into the specified area.

In some embodiments, a value of a purchasing incentive noted in the offer may vary based on an actual number of group members performing the action. For example, a 10% discount may be provided if one other member from the group (e.g., Lisa 50-2) downloads the ACME Store mobile application. If two other members from the group (e.g., Lisa 50-2 and Tom 50-3) download the ACME Store mobile application, the purchasing incentive offer may specify a 20% discount on all purchases made by Bob 50-1. In this example, incentive component 220 may determine the purchasing incentive to be provided to mobile device 55-1 based on the number of group member action confirmations received.

In another embodiment, incentive component 220 may send a reward (e.g., electronic coupon, rebate offer, etc.) to each group member who performs the group member action. The reward may be sent to the respective mobile device of each group member or mailed to the residence of each group member. For example, Lisa 50-2 may receive an electronic coupon upon successfully downloading the ACME Store mobile application.

Figure 6:
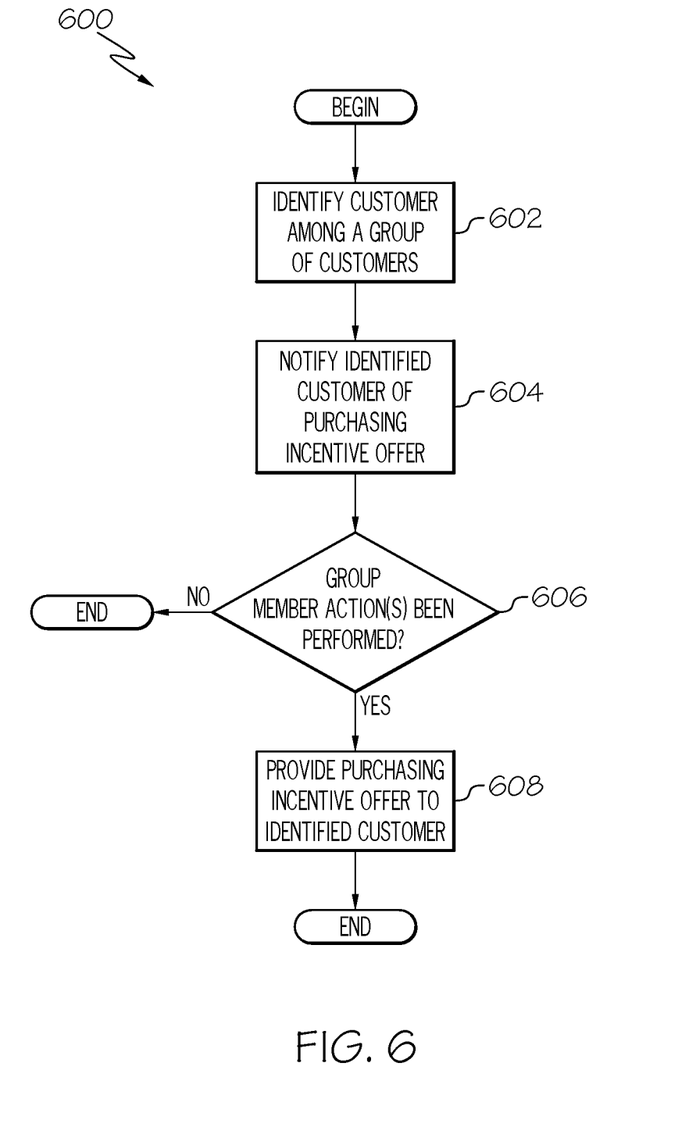
FIG. 6 shows a process flowchart 600 for providing a group-based purchasing incentive related to a product or service at a retail store to a customer among a group of customers contingent on an action being performed by a predefined number of members from the group according to illustrative embodiments.

Referring now to FIG. 6, in conjunction with FIG. 2, an implementation of a process flowchart 600 for providing a group-based purchasing incentive related to a product or service at a retail store to a customer among a group of customers contingent on an action being performed by a predefined number of members from the group is shown. At 602, identification component 210 identifies a customer having a mobile device in a retail store that is part of a group of customers. The customer has previously opted-in to a purchasing incentives service. At 604, notification component 215 transmits a notification to the identified customer that a purchasing incentive offer will be provided if a specified number of other customers of the group complete an action. At 606, incentive component 220 receives a confirmation that the specified number of other customers have performed the action. At 608, incentive component 220 provides the purchasing incentive to the identified customer.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for providing a group-based purchasing incentive related to a product or service at a retail store to a customer among a group of customers contingent on an action being performed by a predefined number of members from the group. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for providing a group-based purchasing incentive related to a product or service at a retail store to a customer among a group of customers contingent on an action being performed by a predefined number of members from the group. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for providing a group-based purchasing incentive related to a product or service at a retail store to a customer among a group of customers contingent on an action being performed by a predefined number of members from the group. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for providing a group-based purchasing incentive, the method comprising:
identifying, in response to an identification a location of a mobile device of a customer in a retail store, a currently existing group of customers who are shopping together in cooperation with the customer and are co-located proximate to the customer within the retail store, wherein the group of customers are identified with the customer based on a combination of location sensing technology and social media profile data;
transmitting, in response to the identifying of the group of customers, a notification of a first group-based purchasing incentive offer for the retail store in which the group of customers is located that is applicable to the group of customers who are shopping together in cooperation with the customer to the mobile device of the identified customer but not to other members of the group of customers, wherein the first group-based purchasing incentive offer is contingent on a first specified number of other customers in the group of customers who are shopping together in cooperation with the customer performing an action; and
providing, in response to the first specified number of other customers in the group of customers who are shopping together in cooperation with the customer performing the action, the first group-based purchasing incentive to the identified customer, wherein a value of the first group-based purchasing incentive noted in the offer varies based on an actual number of other customers in the group of customers who are shopping together in cooperation with the customer who perform the action.

2. The computer-implemented method of claim 1, wherein the notification includes a second group-based purchasing incentive offer, wherein the second group-based purchasing incentive offer is contingent on a second specified number of other customers in the group performing the action.

3. The computer-implemented method of claim 2, further comprising providing, in response to the second specified number of other customers in the group performing the action, the second group-based purchasing incentive to the identified customer.

4. The computer-implemented method of claim 1, further comprising determining the identified customer is part of a group of customers based on a behavior of the group, including a common movement pattern, in the retail store and a detected relationship between the identified customer and each other customer in the group.

5. The computer-implemented method of claim 4, wherein the behavior of the group is determined using at least one of location data of each customer within the group captured using location sensing techniques or tracks of each customer within the group captured using tracking techniques.

6. The computer-implemented method of claim 4, wherein the detected relationship between the identified customer and each other customer in the group is determined using ambient proximity technology based on a previously established social media relationship with the identified customer and a recent activity of the other customer recorded in at least one social media account.

7. The computer-implemented method of claim 1, further comprising receiving a confirmation for each action when performed.

8. A computer program product for providing a group-based purchasing incentive, and program instructions stored on computer readable storage device, to:
identify, in response to an identification a location of a mobile device of a customer in a retail store, a currently existing group of customers who are shopping together in cooperation with the customer and are co-located proximate to the customer within the retail store, wherein the group of customers are identified with the customer based on a combination of location sensing technology and social media profile data;
transmit a notification of a first group-based purchasing incentive offer for the retail store in which the group of customers is located that is applicable to the group of customers who are shopping together in cooperation with the customer to the mobile device of the identified customer but not to other members of the group of customers, wherein the first group-based purchasing incentive offer is contingent on a first specified number of other customers in the group of customers who are shopping together in cooperation with the customer performing an action; and
provide, in response to the first specified number of other customers in the group of customers who are shopping together in cooperation with the customer performing the action, the first group-based purchasing incentive to the identified customer, wherein a value of the first group-based purchasing incentive noted in the offer varies based on an actual number of other customers in the group of customers who are shopping together in cooperation with the customer who perform the action.

9. The computer program product of claim 8, wherein the notification includes a second group-based purchasing incentive offer, wherein the second group-based purchasing incentive offer is contingent on a second specified number of other customers in the group performing the action.

10. The computer program product of claim 9, further comprising program instructions to provide, in response to the second specified number of other customers in the group performing the action, the second group-based purchasing incentive to the identified customer.

11. The computer program product of claim 8, further comprising program instructions to determine the identified customer is part of a group of customers based on a behavior of the group, including a common movement pattern, in the retail store and a detected relationship between the identified customer and each other customer in the group.

12. The computer program product of claim 11, wherein the behavior of the group is determined using at least one of location data of each customer within the group captured using location sensing techniques or tracks of each customer within the group captured using tracking techniques.

13. The computer program product of claim 11, wherein the detected relationship between the identified customer and each other customer in the group is determined using ambient proximity technology based on a previously established social media relationship with the identified customer and a recent activity of the other customer recorded in at least one social media account.

14. The computer program product of claim 8, further comprising program instructions to receive a confirmation for each action when performed.

15. A computer system for providing a group-based purchasing incentive, the computer system comprising:
a memory medium comprising program instructions;
a bus coupled to the memory medium; and
a processor for executing the program instructions, the instructions causing the system to:
identify, in response to an identification a location of a mobile device of a customer in a retail store, a currently existing group of customers who are shopping together in cooperation with the customer and are co-located proximate to the customer within the retail store, wherein the group of customers are identified with the customer based on a combination of location sensing technology and social media profile data;
transmit a notification of a first group-based purchasing incentive offer for the retail store in which the group of customers is located that is applicable to the group of customers who are shopping together in cooperation with the customer to the mobile device of the identified customer but not to other members of the group of customers, wherein the first group-based purchasing incentive offer is contingent on a first specified number of other customers in the group of customers who are shopping together in cooperation with the customer performing an action; and
provide, in response to the first specified number of other customers in the group of customers who are shopping together in cooperation with the customer performing the action, the first group-based purchasing incentive to the identified customer, wherein a value of the first group-based purchasing incentive noted in the offer varies based on an actual number of other customers in the group of customers who are shopping together in cooperation with the customer who perform the action.

16. The computer system of claim 15, wherein the notification includes a second group-based purchasing incentive offer, wherein the second group-based purchasing incentive offer is contingent on a second specified number of other customers in the group performing the action.

17. The computer system of claim 16, further comprising program instructions to provide, in response to the second specified number of other customers in the group performing the action, the second group-based purchasing incentive to the identified customer.

18. The computer system of claim 15, further comprising program instructions to determine the identified customer is part of a group of customers based on a behavior of the group, including a common movement pattern, in the retail store and a detected relationship between the identified customer and each other customer in the group.

19. The computer system of claim 18, wherein the behavior of the group is determined using at least one of location data of each customer within the group captured using location sensing techniques or tracks of each customer within the group captured using tracking techniques.

20. The computer system of claim 18, wherein the detected relationship between the identified customer and each other customer in the group is determined using ambient proximity technology based on a previously established social media relationship with the identified customer and a recent activity of the other customer recorded in at least one social media account.

\* \* \* \* \*